US005900885A

United States Patent [19]

Stortz

[11] Patent Number: 5,900,885

[45] **Date of Patent: * May 4, 1999**

[54] COMPOSITE VIDEO BUFFER INCLUDING INCREMENTAL VIDEO BUFFER

[75] Inventor: James L. Stortz, Spring, Tex.

[73] Assignee: Compaq Computer Corp., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,122

[22] Filed: Sep. 3, 1996

[51] Int. Cl.[6] .................................................... G06F 13/00

[52] U.S. Cl. .......................... 345/508; 345/512; 711/157; 711/204

[58] Field of Search .................................... 345/501, 502, 345/512, 507–509; 711/204–207, 157

[56] References Cited

U.S. PATENT DOCUMENTS

| | | | |
|---|---|---|---|
| 5,335,322 | 8/1994 | Mattison | 345/507 |
| 5,587,726 | 12/1996 | Moffat | 345/508 |
| 5,659,715 | 8/1997 | Wu et al. | 345/507 |

*Primary Examiner*—Kee M. Tung
*Attorney, Agent, or Firm*—Paul N. Katz; Ronald L. Chichester; Frohwitter

[57] ABSTRACT

A method for providing a video buffer includes reserving an incremental video buffer in system memory, and controlling the use of a dedicated video buffer and the incremental video buffer to provide a composite video buffer.

5 Claims, 2 Drawing Sheets

COMPOSITE VIDEO BUFFER INCLUDING INCREMENTAL VIDEO BUFFER

BACKGROUND

This invention relates to computer video controllers.

In personal computers, display of information is typically handled by a dedicated video controller with an associated dedicated video memory. One portion of the dedicated video memory has a frame buffer which corresponds to the pixels to be displayed on a computer monitor. Other portions of video memory can include motion video buffers, buffers for discrete icons (such as cursors, or "pop-ups" displaying system functions like battery life, and the like), and other buffers.

The frame buffer is typically organized in a standard 256K by 16 bit memory architecture, written by a particular width video memory interface. For example, a 32 bit wide video memory interface can access a one megabyte frame buffer, while a 64 bit interface can accommodate a two megabyte frame buffer. The amount of memory required for a given frame buffer, though, is determined by the resolution and dimensions of a given display. For example, a 1024 by 768 pixel display with 16 bits per pixel color depth requires a 1.5 megabyte frame buffer. To accommodate that display, a 2 megabyte dedicated video memory might be required, but this use would "waste" 0.5 megabytes of memory.

Computer manufacturers and users face the choice of paying increased costs to have more dedicated memory to handle higher-resolution displays (and possibly waste extra memory), or accept lower resolution displays. This choice is becoming more important as manufacturers are integrating the video controller and its dedicated video memory all on the same semiconductor die: choice of memory size becomes fixed during manufacture.

SUMMARY

In general, in one aspect, the invention features a method for providing a video buffer including reserving an incremental video buffer in system memory, and controlling the use of a dedicated video buffer and the incremental video buffer to provide a composite video buffer.

Embodiments of the invention may include the following features. The controlling may be performed by a video controller or a system memory controller, and may include interleaving portions of the incremental video buffer with portions of the dedicated video buffer. A portion of a dedicated video memory may be reserved as a look-ahead buffer. Data may be retrieved from the incremental video buffer into the look-ahead buffer while data from the dedicated video buffer is read for display, and data may be read from the look-ahead buffer for display.

In general, in another aspect, the invention features a video controller, a dedicated video buffer coupled to the video controller, and an incremental video buffer in system memory, the dedicated video buffer and the incremental video buffer being controlled to form a composite video buffer.

Embodiments of the invention may include the following features. The dedicated video buffer and the incremental video buffer may be controlled by the video controller or by a system memory controller to form the composite video buffer. The composite video buffer may include interleaved portions of the dedicated video buffer and the incremental video buffer. A look-ahead buffer may be coupled to the video controller.

In general, in another aspect, the invention features a computer including a microprocessor, a video controller coupled to the microprocessor, a dedicated video buffer coupled to the video controller, and an incremental video buffer in system memory, the dedicated video buffer and the incremental video buffer being controlled to form a composite video buffer.

Embodiments of the invention may include a display coupled to the video controller.

The advantages of the invention may include one or more of the following. A basic provision of dedicated video memory may be augmented as required for higher resolution displays, or for higher color depth, without requiring additional memory or a new video controller card. Incremental video memory may be implemented "on-the-fly" as needed. Interleaving the incremental and dedicated video memory allows for a seamless display of information without appreciable delays.

Other features and advantages of the invention will become apparent from the following description and from the claims.

DESCRIPTION

Figure 1:
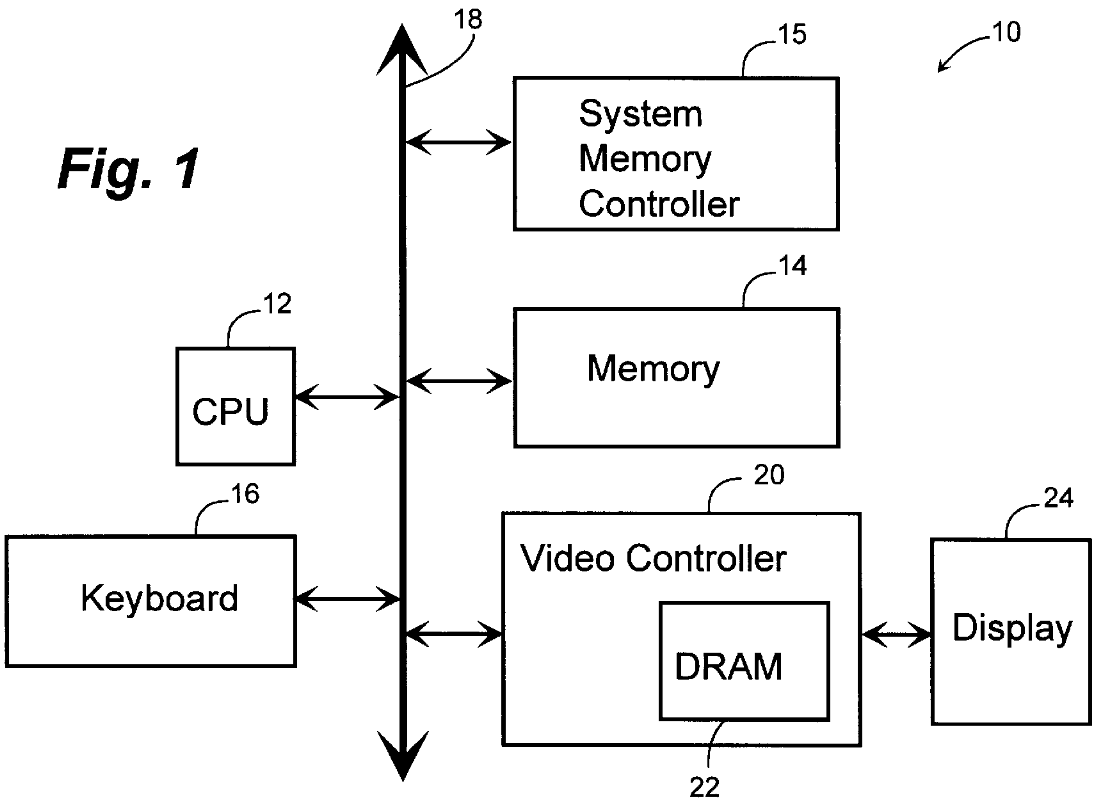
FIG. 1 is a block diagram of a computer implementing an incremental video buffer.

Referring to FIG. 1, a computer 10 implementing an incremental video buffer comprises CPU 12, system memory 14, system memory controller 15, a keyboard (or other data entry device) 16, all coupled via bus 18 (which can be one or more separate bus lines, e.g., microprocessor bus, ISA bus, and PCI bus), and a video controller 20 having a dedicated video memory 22 (implemented in dynamic random access memory "DRAM"), which provides information for display 24.

Figure 2:
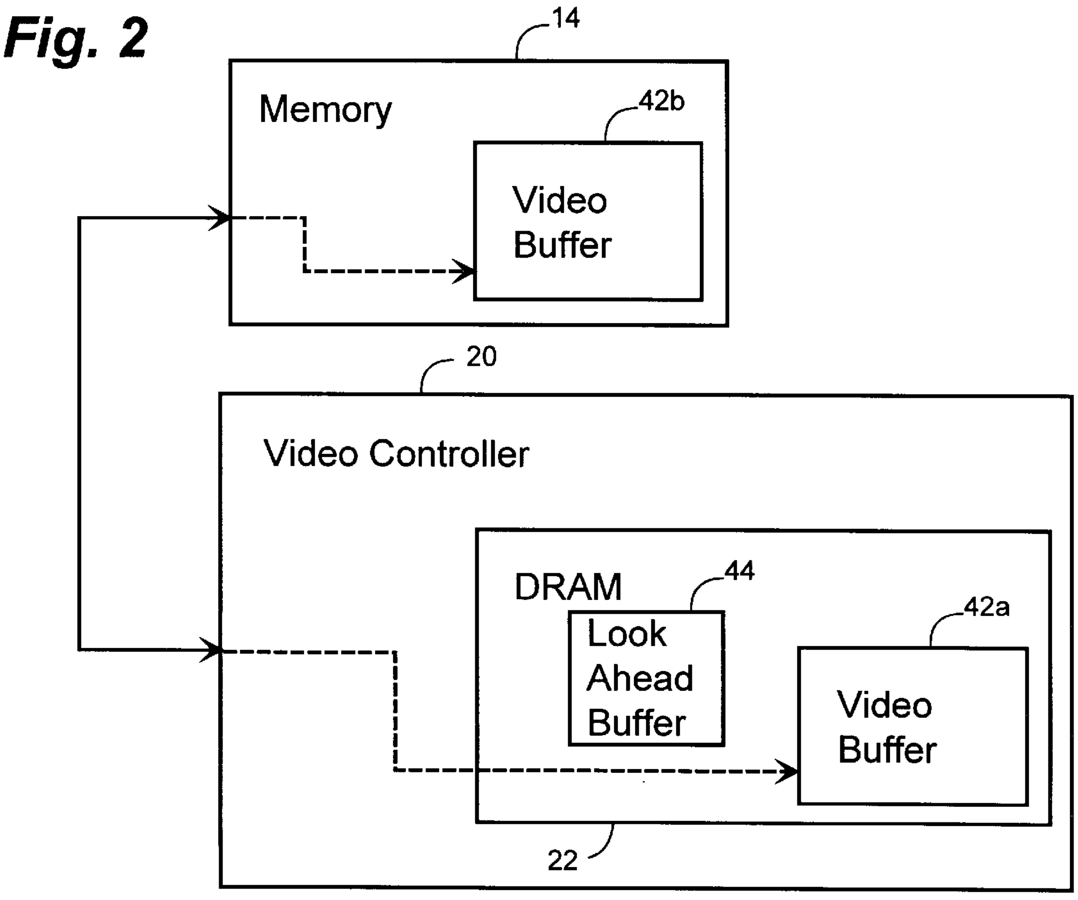
FIG. 2 is a schematic diagram of a video controller and a system memory implementing an incremental video buffer.

Referring to FIG. 2, video controller 20 controls a main dedicated video buffer 42*a* in its own dedicated DRAM video memory 22 as well as an incremental video buffer 42*b* allocated from system memory 14. Video controller 20 thereby combines these two buffer areas 42*a* and 42*b* together to yield a composite video frame buffer. The composite video frame buffer is useful when a particular display device driver requires more memory than was manufactured into a video controller integrated circuit. Video controller 20 can dynamically adapt to different display needs without either adding more dedicated video memory, or purchasing and installing a new higher memory video controller.

To implement incremental video buffer 42*b*, a certain amount of system memory 14 may require deallocation, possibly through the computer BIOS or through a modification of system memory controller 15, to allow its control by video controller 20. Dedicated video memory 22 can be sized for mainstream applications, and incremental video buffer 42*b* would be available for those users requiring higher resolutions and/or display configurations.

Figure 3:
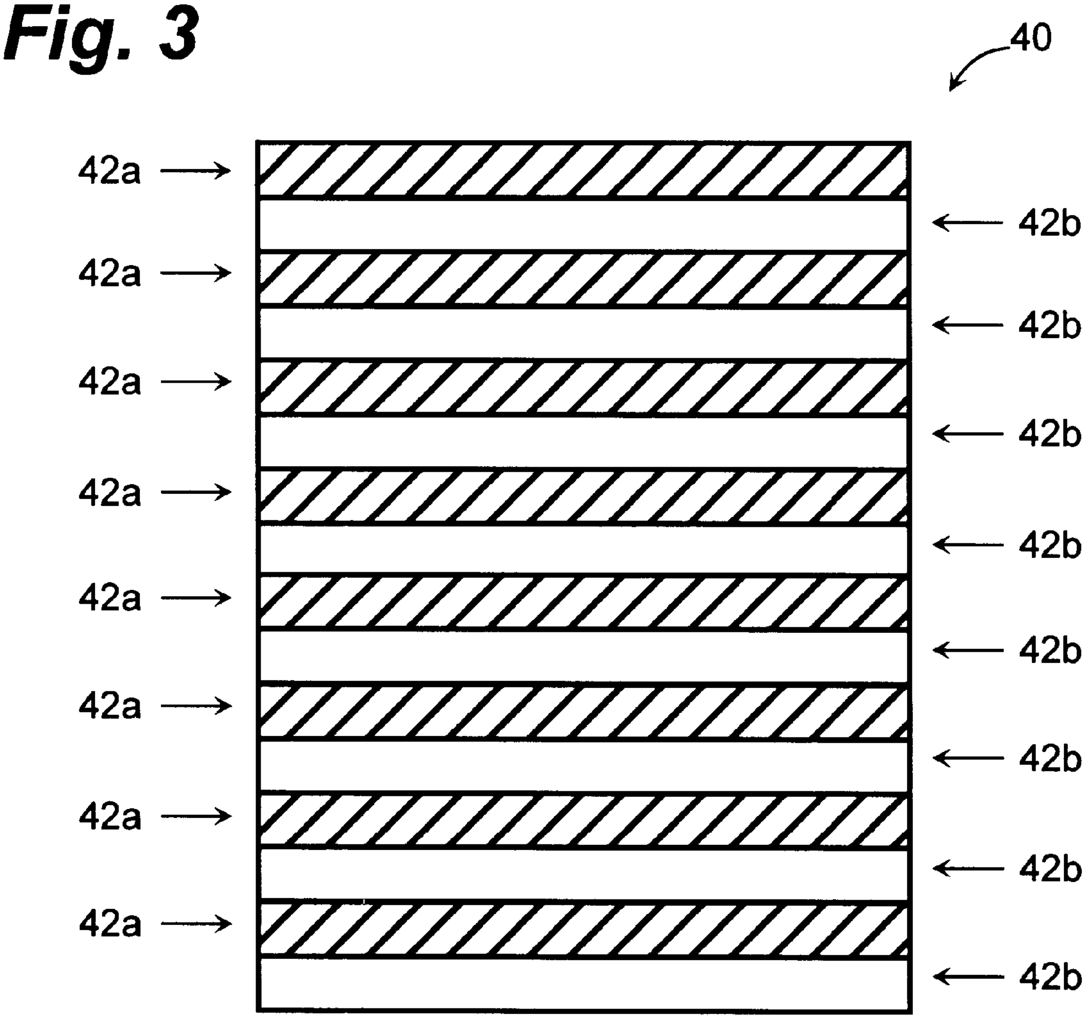
FIG. 3 is a schematic diagram of an interleaved frame buffer.

Referring to FIG. 3, composite video frame buffer 40 comprises interleaved portions of dedicated video buffer 42*a* and incremental video buffer 42*b*. Interleaving allows data readout rates from the composite video frame buffer to be adequate, despite the fact that "slower" system memory is being used for a portion of the buffer. For example, a portion of dedicated video memory 22 can include a look-ahead video buffer 44. Look-ahead video buffer 44 can receive direct memory accesses of the next interleaved portion of data coming from incremental video buffer 42*b*, while the current portion of data is read out from dedicated video buffer 42*a* to display 24. After this local data is read, the next portion of display data can be read directly from look-ahead video buffer 44 (instead of from system memory 14). Since look-ahead video buffer 44 is implemented in higher speed dedicated video memory 22, there is no decrement in effective readout speed between the interleaved portions of composite video frame buffer 40.

Other embodiments are within the scope of the claims. For example, the coordination and control of the two video buffers may be performed by system memory controller 15 instead of video controller 20. With faster system memory, no interleaving may be required.

What is claimed is:

1. A computer system comprising:

a central processing unit;

a first memory storing first video information and program information used by said central processing unit;

a video controller comprising a look ahead buffer and a second memory storing second video information;

said video controller obtaining a portion of the first video information stored in said first memory and storing the portion of the first video information into said look ahead buffer while a portion of the second video information stored in said second memory is being displayed on a video display; and said video controller displaying the portion of the first video information stored in said look ahead buffer on the video display.

2. The computer system of claim 1, wherein:

the portion of the first video information stored in said look ahead buffer and the portion of the second video information stored in said second memory is alternately displayed on the video display; and another portion of the first video information from said first memory is stored in said look ahead buffer while another portion of the second video information is displayed on the video display.

3. The computer system of claim 1, wherein said second memory and look ahead buffer have faster response times than said first memory.

4. The computer system of claim 3, wherein said look ahead buffer and said second memory are comprised of video random access memory.

5. A method in a computer system for storing and retrieving video information for display on a video display, said method comprising the steps of:

a) providing a central processing unit for executing program instructions;

b) storing the program instructions executed by said central processing unit in a first memory;

c) storing first video information in said first memory;

d) providing a video controller comprising a second memory and a look ahead buffer;

e) storing second video information in said second memory;

f) obtaining a portion of the first video information stored in said first memory and placing the portion of the first video information into said look ahead buffer while a portion of the second video information stored in said second memory is being displayed on a video display;

g) displaying the portion of the first video information stored in said look ahead buffer on the video display; and h) repeating steps f and g.

* * * * *